US009191516B2

(12) United States Patent
Villette et al.

(10) Patent No.: US 9,191,516 B2
(45) Date of Patent: Nov. 17, 2015

(54) TELECONFERENCING USING STEGANOGRAPHICALLY-EMBEDDED AUDIO DATA

(71) Applicant: Qualcomm Incorporated, San Diego, CA (US)

(72) Inventors: Stephane Pierre Villette, San Diego, CA (US); Daniel J. Sinder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 136 days.

(21) Appl. No.: 13/771,957

(22) Filed: Feb. 20, 2013

(65) Prior Publication Data

US 2014/0233716 A1 Aug. 21, 2014

(51) Int. Cl.
*H04M 3/56* (2006.01)
*G10L 19/018* (2013.01)

(52) U.S. Cl.
CPC ............. *H04M 3/568* (2013.01); *G10L 19/018* (2013.01)

(58) Field of Classification Search
USPC ..................... 379/202.01, 158; 455/415, 416; 370/260
See application file for complete search history.

(56) References Cited

U.S. PATENT DOCUMENTS

| 6,457,043 | B1 * | 9/2002 | Kwak et al. ................... 709/204 |
| 6,639,997 | B1 * | 10/2003 | Katsura et al. ................ 382/100 |
| 7,158,624 | B1 | 1/2007 | O'Toole, Jr. |
| 8,170,882 | B2 * | 5/2012 | Davis ............................ 704/500 |
| 8,175,280 | B2 * | 5/2012 | Villemoes et al. .............. 381/17 |
| 8,280,083 | B2 * | 10/2012 | Pallone et al. ................ 381/300 |
| 2003/0035553 | A1 | 2/2003 | Baumgarte et al. |

(Continued)

FOREIGN PATENT DOCUMENTS

| EP | 2337328 A1 | 6/2011 |
| WO | 2005062297 A1 | 7/2005 |
| WO | 2009107054 A1 | 9/2009 |

OTHER PUBLICATIONS

Gopalan et al., "Audio steganography for covert data transmission by imperceptible tone insertion," 2004 (the year of publication is sufficiently earlier than the effective U.S. filing date and any foreign priority date so that the particular month of publication is not an issue), Dept. of Engineering, Purdue University Calument, Hammond, IN, Retrieved from: http://www.purduecal.edu/engr/docs/GopalanKali_1422_049.pdf, 5 pp.

(Continued)

*Primary Examiner* — William Deane, Jr.
(74) *Attorney, Agent, or Firm* — Shumaker & Sieffert, P.A,

(57) ABSTRACT

A multi-party control unit (MCU) generates, based on audio data streams that represent sounds associated terminal devices, a mixed audio data stream. In addition, the MCU modifies the mixed mono audio data to steganographically embed sub-streams that include representations of the mono audio data streams. A terminal device receives the modified mixed audio data stream. When the terminal device is configured for stereo playback, the terminal device performs an inverse steganographic process to extract, from the mixed audio data stream, the sub-streams. The terminal device generates and outputs multi-channel audio data based on the extracted sub-streams and the mixed audio data stream. When the terminal device is not configured for stereo playback, the terminal device outputs sound based on the mixed audio data stream without extracting the embedded sub-streams.

29 Claims, 6 Drawing Sheets

(56) References Cited

U.S. PATENT DOCUMENTS

| | | |
|---|---|---|
| 2009/0034704 A1 | 2/2009 | Ashbrook et al. |
| 2010/0316232 A1 | 12/2010 | Acero et al. |
| 2012/0203362 A1 | 8/2012 | Parvaix et al. |
| 2012/0203555 A1 | 8/2012 | Villette et al. |
| 2012/0203556 A1 | 8/2012 | Villette et al. |
| 2012/0203561 A1 | 8/2012 | Villette et al. |

OTHER PUBLICATIONS

Rothbucher et al., "Backwards compatible 3D audio conference server using HRTF synthesis and SIP"Proceedings of the Seventh International Conference on Signal-Image Technology & Internet-Based Systems, IEEE Computer Society, 2011 (the year of publication is sufficiently earlier than the effective U.S. filing date and any foreign priority date so that the particular month of publication is not in issue), 7pp.

Vary et al., "Steganographic Wideband Telephony Using Narrowband Speech Codecs", Conference Record of the Forty-First Asilomar Conference on Signals, Systems and Computers, 2007 (the year of publication is sufficiently earlier than the effective U.S. filing date and any foreign priority date so that the particular month of publication is not in issue), 5 pp.

International Search Report and Written Opinion—PCT/US2014/012788—ISA/EPO—May 9, 2014, 11 pp.

* cited by examiner

TELECONFERENCING USING STEGANOGRAPHICALLY-EMBEDDED AUDIO DATA

TECHNICAL FIELD

This disclosure relates to processing of audio data and, in particular, to the processing of audio data for teleconferencing.

BACKGROUND

A teleconference generally involves establishing telecommunications connections with three or more terminal devices used by participants of the teleconference. For ease of explanation, the terminal devices may be denoted as terminal devices A, B and C. Generally, one of the participants, such as the user of terminal device A, initiates the teleconference by conferencing in the other participants, e.g., users of terminal devices B and C. A conference management device manages the conference. The conference management device may also be referred to as a multiparty control unit (MCU) or, alternatively, as a mixing bridge. The MCU may be located in a service provider network hosting the teleconference.

The MCU may decode audio data streams received at the MCU from the terminal devices and sum audio waveforms represented by two of the three received audio data streams to generate mixed monoaural (i.e., mono) audio waveforms. The MCU may encode the mixed monoaural audio waveforms to generate mixed mono data streams, transmitting the mixed mono data streams to respective ones of the terminal devices.

For example, the MCU may receive and decode audio data streams from terminal devices A, B and C. The MCU generates three mixed audio data streams based on the received audio data streams. The first mixed audio data stream represents a monaural mix of sounds detected by terminal devices A and B (i.e., A+B). The second mixed audio data stream represents a monaural mix of sounds detected by terminal devices A and C (i.e., A+C). The third mixed audio data stream represents a monaural mix of sounds detected by terminal devices B and C (i.e., B+C). The MCU transmits the first mixed audio data stream to terminal device C, transmits the second mixed audio data stream to terminal device B, and transmits the third mixed audio data stream to terminal device A. Terminal devices A, B, and C decode the mixed audio data streams and generate sound based on (i.e., play back) the mixed audio data streams.

Recently, MCUs and terminal devices have been developed that support three-dimensional (3D) audio in teleconferencing. In 3D audio, the MCU processes the audio data streams received from the terminal devices to generate mixed stereo audio data streams. Each of the mixed audio stereo data streams may represent sound having two or more (e.g., a left and a right) channels. The MCU may transmit these mixed stereo audio data streams to appropriate one of the terminal devices. Each of the terminal devices may play back the mixed stereo audio data streams on two or more speakers. Because of head-related transfer functions (HRTFs) applied by the MCU to the stereo audio data streams, users of the terminal devices may perceive the speech of users of the other terminal devices to come from various points in space. For example, a user of terminal device A may perceive the speech of a user of terminal device B to come from a point in space to the left of the user of terminal device A and may perceive speech of a user of terminal device C to come from a point in space to the right of the user of terminal device A. Spatially separating the voices of users in this manner may help the users to determine who is speaking during the teleconference, thereby facilitating communication among the participants of the 3D audio teleconference.

SUMMARY

In general, this disclosure describes techniques for processing audio data for teleconferencing. A multi-party control unit (MCU) receives incoming audio data streams from terminal devices participating in a teleconference. Each of the incoming audio data streams may comprise a monaural representation of sound detected by a respective one of the terminal devices. For each of the terminal devices, the MCU may generate a mixed audio data stream that comprises a monaural representation of a mix of the sounds detected by other ones of the terminal devices. In addition, the MCU may steganographically embed in the mixed audio data stream representations of the sounds detected by the terminal devices. For ease of explanation, the representations of the sounds detected by the terminal devices may be referred to herein as sub-streams. The MCU outputs the mixed audio data stream to a terminal device participating in the teleconference.

If the terminal device is configured for stereo playback, the terminal device performs an inverse steganographic process to extract, from the mixed audio data stream, the embedded sub-streams. The terminal device generates and outputs a multi-channel audio data stream based on the extracted sub-streams and the mixed audio data stream. The terminal device may output sound based on the multi-channel audio data stream. If the terminal device is not configured for stereo playback, the terminal device outputs sound based on the mixed audio data stream without extracting the embedded sub-streams. In this sense, by using steganography to embed the sub-streams, the techniques may enable both multi-channel playback of the mixed audio data stream and monaural playback of the mixed audio data stream.

In one example, this disclosure describes a method comprising generating, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference. The method also comprises generating a modified mixed audio data stream at least in part by steganographically embedding into the mixed audio data stream a first sub-stream and a second sub-stream such that the modified mixed audio data stream supports both mono audio playback and stereo audio playback, the first sub-stream including a representation of the sound associated with the first terminal device, the second sub-stream including a representation of the sound associated with the second terminal device. In addition, the method comprises outputting the modified mono audio data stream to a third terminal device participating in the teleconference.

In another example, this disclosure describes a method comprising performing an inverse steganographic process to extract, from a mixed audio data stream, a first sub-stream, wherein the first sub-stream is associated with a first terminal device participating in a teleconference. The method also comprises performing an inverse steganographic process to extract, from the mixed audio data stream, a second sub-stream, wherein the second sub-stream is associated with a second terminal device participating in the teleconference. In addition, the method comprises generating, based at least in part on the mixed audio data stream, the first sub-stream and the second sub-stream, a multi-channel audio data stream.

In another example, this disclosure describes a device comprising one or more processors configured to generate, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference. The one or more processors are also configured to generate a modified mixed audio data stream at least in part by steganographically embedding into the mixed audio data stream a first sub-stream and a second sub-stream such that the modified mixed audio data stream supports both mono audio playback and stereo audio playback, the first sub-stream including a representation of the sound associated with the first terminal device, the second sub-stream including a representation of the sound associated with the second terminal device. Furthermore, the one or more processors are configured to output the modified mono audio data stream to a third terminal device participating in the teleconference.

In another example, this disclosure describes a terminal device comprising one or more processors configured to perform an inverse steganographic process to extract, from a mixed audio data stream, a first sub-stream. The first sub-stream is associated with a first terminal device participating in a teleconference. The one or more processors are also configured to perform an inverse steganographic process to extract, from the mixed audio data stream, a second sub-stream. The second sub-stream is associated with a second terminal device participating in the teleconference. The one or more processors are also configured to generate, based at least in part on the mixed audio data stream, the first sub-stream and the second sub-stream, a multi-channel audio data stream.

In another example, this disclosure describes a device comprising means for generating, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference. The device also comprises means for generating a modified mixed audio data stream at least in part by steganographically embedding into the mixed audio data stream a first sub-stream and a second sub-stream such that the modified mixed audio data stream supports both mono audio playback and stereo audio playback, the first sub-stream including a representation of the sound associated with the first terminal device, the second sub-stream including a representation of the sound associated with the second terminal device. In addition, the device comprises means for outputting the modified mono audio data stream to a third terminal device participating in the teleconference.

In another example, this disclosure describes a terminal device comprising means for performing an inverse steganographic process to extract, from a mixed audio data stream, a first sub-stream. The first sub-stream is associated with a first terminal device participating in a teleconference. The terminal device also comprises means for performing an inverse steganographic process to extract, from the mixed audio data stream, a second sub-stream, wherein the second sub-stream is associated with a second terminal device participating in the teleconference. In addition, the terminal device comprises means for generating, based at least in part on the mixed audio data stream, the first sub-stream and the second sub-stream, a multi-channel audio data stream.

In another example, this disclosure describes a computer-readable storage medium that stores instructions that, when executed by one or more processors of a device, configure the device to generate, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference. The instructions also configure the device to generate a modified mixed audio data stream at least in part by steganographically embedding into the mixed audio data stream a first sub-stream and a second sub-stream such that the modified mixed audio data stream supports both mono audio playback and stereo audio playback, the first sub-stream including a representation of the sound associated with the first terminal device, the second sub-stream including a representation of the sound associated with the second terminal device. Furthermore, the instructions configure the device to output the modified mono audio data stream to a third terminal device participating in the teleconference.

In another example, this disclosure describes a computer-readable storage medium that stores instructions that, when executed by one or more processors of a device, configure the device to perform an inverse steganographic process to extract, from a mixed audio data stream, a first sub-stream. The first sub-stream is associated with a first terminal device participating in a teleconference. The instructions also configure the device to perform an inverse steganographic process to extract, from the mixed audio data stream, a second sub-stream. The second sub-stream is associated with a second terminal device participating in the teleconference. In addition, the instructions configure the device to generate, based at least in part on the mixed audio data stream, the first sub-stream and the second sub-stream, a multi-channel audio data stream.

The details of one or more examples of the disclosure are set forth in the accompanying drawings and the description below. Other features, objects, and advantages will be apparent from the description, drawings, and claims.

DETAILED DESCRIPTION

Figure 1:
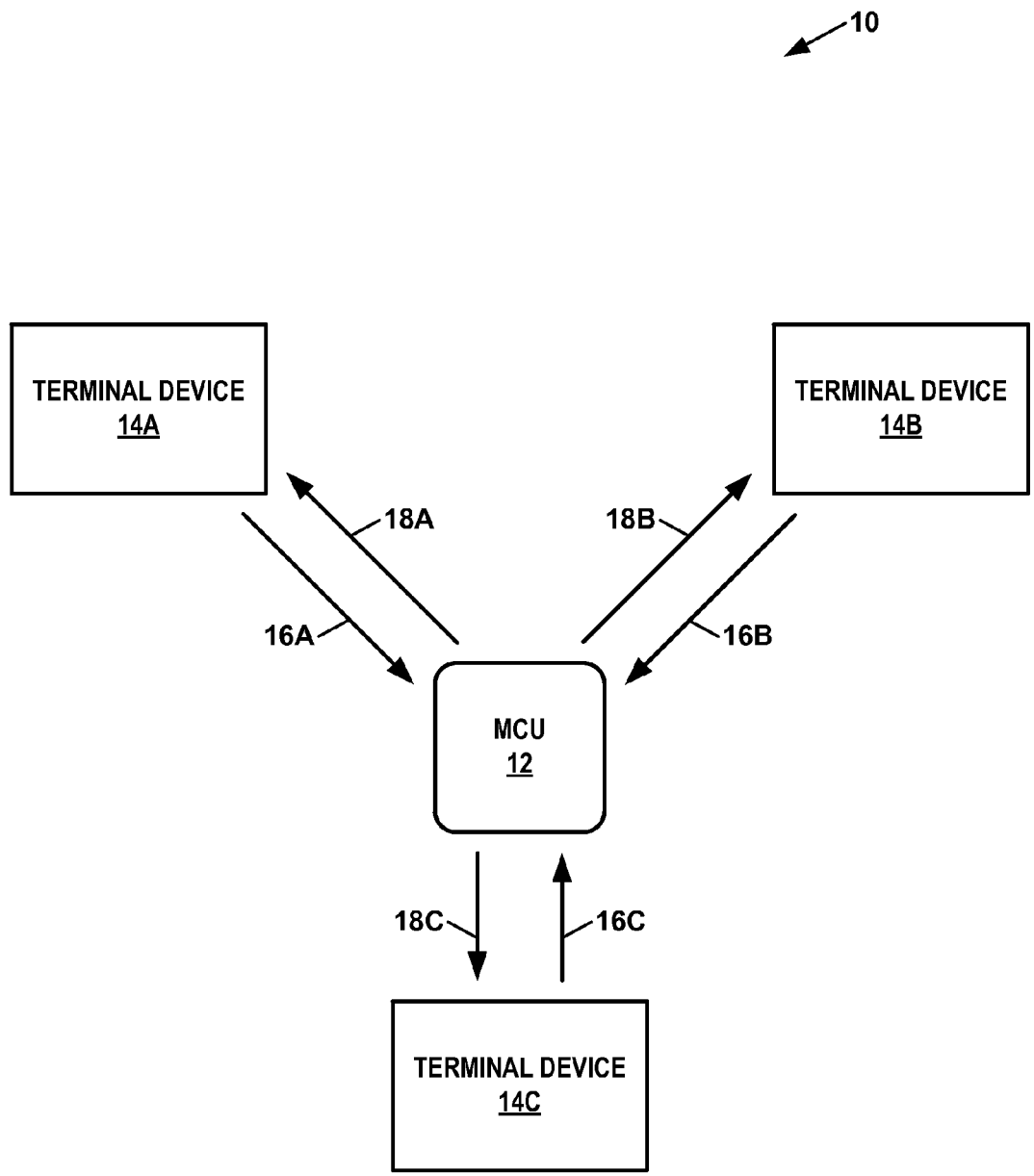
FIG. 1 is a block diagram illustrating an example teleconferencing system that may utilize the techniques described in this disclosure.

Teleconferencing enables three or more parties to converse with each other using terminal devices to both capture audio data (often, speech audio data) and playback audio data captured by other terminal devices. Users participating in a teleconference are typically associated with separate terminal devices, such as telephones or special-purpose teleconferencing equipment. Furthermore, teleconferencing systems may include a multi-party control unit (MCU). The terminal devices generate audio data streams based on sound detected by one or more microphones of the terminal devices. The terminal devices transmit the generated audio data streams to the MCU. The MCU may mix the sounds represented by the audio data streams and encode the resulting sounds to generate a plurality of mixed audio data streams. When the MCU is configured for three-dimensional (3D) audio teleconferencing, the MCU may generate stereo mixed audio data streams, each of which may include a left audio channel and a right audio channel.

While 3D audio in teleconferencing may improve the subjective audio quality for participating users and potentially improve the teleconferencing experience, 3D audio teleconferencing may require higher bit rates to provide the multi-channel (e.g., left and right channel) audio data streams. Consequently, the MCU may need to transmit significantly more data to the terminal devices when 3D audio is used in teleconferencing than when conventional, non-3D, audio is used in teleconferencing. Furthermore, the mixed stereo audio data streams may not be backwards compatible. That is, legacy mono-only terminal devices may not be able to play back mixed stereo audio data streams. As a result, only terminal devices specifically designed for 3D audio may be used when participating in a 3D audio teleconference. Given the expense and low availability of the terminal devices that support 3D audio teleconferencing, adoption of 3D audio teleconferencing has been limited, given the potentially high costs associated with upgrading terminal devices and the MCU to support 3D audio teleconferencing in comparison to improvements in the teleconferencing experience.

The techniques of this disclosure may facilitate the adoption of 3D audio teleconferencing, without significantly increasing upgrade costs, by embedding sub-streams that enable 3D audio teleconferencing while also maintaining backwards compatibility through support of legacy mono-only terminal devices. In accordance with the techniques of this disclosure, a MCU may receive audio data streams that include monaural representations of sounds detected by (e.g., associated with) terminal devices participating in a teleconference. The MCU may generate a high-quality mixed audio data stream for each of the terminal devices. The high-quality mixed audio data stream for a particular terminal device may include a monaural representation of a mix of the sounds detected by the terminal devices other than the particular terminal device to which the mixed audio data stream is to be sent. Furthermore, the MCU may perform a form of steganography (which may be commonly referred to as "watermarking") to embed, in the high-quality mixed audio data stream, low-quality representations of the sounds detected by the other terminal devices. For ease of explanation, the low-quality representations of the sounds detected by the terminal devices may be referred to herein as sub-streams. In some examples, the MCU may embed the sub-streams into the high-quality mixed audio data stream without increasing the bitrate of the high-quality mixed audio data stream. Performing steganography typically involves modifying what may be considered as redundant data in a given amount of data to seamlessly "hide" additional data such that the original data does not increase in size or even impact the original data as perceived by a viewer or, in this case, listener due to limitations in the human visual or auditory systems.

The MCU outputs the high-quality mixed audio data streams to the terminal devices participating in the teleconference. When a terminal device participating in the teleconference is configured for multi-channel 3D audio playback (such as stereo audio playback), the terminal device may perform an inverse steganographic process to extract, from the high-quality mixed audio data stream, the steganographically embedded sub-streams. The terminal device may generate spatialized (which may be referred to as "three dimensional" or "3D") multi-channel (e.g., stereo) audio data based on the extracted sub-streams and the high-quality mixed audio data stream. The terminal device may generate multi-channel (e.g., stereo) sound based on the spatialized multi-channel audio data.

When a terminal device participating in the teleconference is not configured for multi-channel playback, the terminal device may generate mono sound based on the mixed audio data stream without extracting the sub-streams from the mixed audio data stream. Because the sub-streams are steganographically embedded in the mixed audio data stream, a user of a terminal device that does not support multi-channel audio playback may be unable to determine that the sub-streams are embedded in the mixed audio data stream. Again, the sub-streams are "hidden" from these terminal devices that do not support multi-channel audio playback using steganography without compromising the integrity of the mixed audio data stream from the perspective of a listener. In some instances, 3D audio may require a tandem free operation (TFO)/Transcoder Free Operation (TrFO) network, otherwise quality may fall back to legacy mono.

In this way, the MCU may generate audio data streams that are capable of multi-channel audio playback and are backward compatible with terminal devices that do not support multi-channel audio playback. In other words, the mixed audio data stream is compatible with terminal devices that are configured for monaural playback and are not configured for multi-channel (e.g., stereo) playback. Furthermore, the techniques of this disclosure may enable terminal devices to determine sources (e.g., terminal devices) associated with sounds even when the mixed audio data stream concurrently includes sounds from multiple sources. For instance, the sounds associated with a first terminal device may include speech that is concurrent with speech associated with a second terminal device.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words may merely refer to different elements of a same or similar type.

FIG. 1 is a block diagram illustrating an example teleconferencing system 10 that may perform the techniques described in this disclosure. As shown in FIG. 1, teleconferencing system 10 includes a multi-party control unit (MCU) 12. In addition, conferencing system 10 includes a plurality of terminal devices 14A-14C (collectively, "terminal devices 14"). The example of FIG. 1 only shows three terminal devices for ease of illustration purposes. However, other example teleconferencing systems may include more than three terminal devices, and the techniques of this disclosure may be performed by teleconferencing systems that include three or more terminal devices.

MCU 12 may comprise various types of devices. For example, MCU 12 may comprise a specialized MCU device, a server computer, a personal computer, or another type of device. Likewise, terminal devices 14 may comprise various types of devices. For example, one or more of terminal devices 14 may comprise a mobile or landline telephone, a desktop computer, a mobile computing device, a notebook (e.g., laptop) computer, a tablet computer, a television set-top box, a video gaming console, an in-car computer, specialized audio and/or video conferencing equipment, or other types of devices configured for teleconferencing. In some examples, MCU 12 is physically located in a network of a service provider that hosts a teleconference. Terminal devices 14 may be at various locations, such as in users' offices, homes, or vehicles. In some examples, terminal devices 14 may be mobile devices.

MCU 12 may communicate with each of terminal devices 14. In various examples, MCU 12 communicates data with terminal devices 14 in various ways. For example, MCU 12 may communicate data with one or more of terminal devices 14 via a communications network, such as the Internet, a local area network (LAN), a Plain Old Telephone System (POTS) network, a cellular or mobile network, a cellular data network, or a combination thereof. In some examples, MCU 12 may communicate with terminal devices 14 via wired and/or wireless communication media.

One or more users may use each of terminal devices 14 to participate in a teleconference. During the teleconference, the participating users may verbally converse with each other. For example, three users, A, B, and C, may participate in the teleconference using terminal devices 14A, 14B, and 14C, respectively. In this example, terminal device 14A may capture sound, e.g., speech, generated by user A in the form of audio data and may reproduce sound, e.g., speech, captured by terminal devices 14B and 14C. Terminal device 14B may capture sound generated by user B and may reproduce sound captured by terminal devices 14A and 14C. Terminal device 14C may capture sound generated by user C and may reproduce sound captured by terminal devices 14A and 14B.

Terminal devices 14 may generate audio data streams based on the sounds captured by terminal devices 14. For instance, terminal devices 14 may generate audio data streams that include monaural representations of the sounds detected and captured by terminal devices 14. Terminal devices 14 may transmit the audio data streams to MCU 12. In the example of FIG. 1, arrows 16A, 16B, and 16C indicate the audio data streams transmitted to MCU 12 from terminal devices 14A, 14B, and 14C, respectively. An audio data stream is a stream of audio data provided over time. For instance, terminal devices 14 may transmit the audio data streams to MCU 12 in near real time as terminal devices 14 detect, capture and encode sound, which again is commonly in the form of speech. Terminals devices 14 may each include voice or speech encoders (which are commonly referred to as "vocoders") to encode the speech and thereby generate the audio data streams. Vocoders may represent encoders that feature encoding processes tailored for encoding speech.

MCU 12 receives the audio data streams transmitted by terminal devices 14. As MCU 12 receives the audio data streams, MCU 12 may generate a plurality of mixed audio data streams. MCU 12 may transmit different mixed audio data streams to different terminal devices 14. In the example of FIG. 1, MCU 12 may transmit a first mixed audio data stream to terminal device 14A, a second mixed audio data stream to terminal device 14B, and a third mixed audio data stream to terminal device 14C. In the example of FIG. 1, arrows 18A, 18B, and 18C indicate the mixed audio data streams transmitted to terminal devices 14A, 14B, and 14C, respectively.

The mixed audio data stream for a particular terminal device may include a mix of the sounds captured by other terminal devices participating in the teleconference. In some examples, MCU 12 may mix the sounds captured by the other terminal devices by adding corresponding (e.g., concurrent) audio samples indicated in the audio data streams received from the other terminal devices. For example, MCU 12 mixes the sounds detected by the other terminal devices by adding audio samples of a first audio data stream to corresponding audio samples of a second audio data stream.

In addition to generating the mixed audio data streams, MCU 12 may, in accordance with the techniques of this disclosure, generate a plurality of sub-streams. Each of the sub-streams may include a representation of the sounds captured by a different one of terminal devices 14. A sub-stream that includes a representation of sounds captured by a particular terminal device may be referred to herein as the sub-stream associated with the particular terminal device.

In some examples, the sub-streams have lower bitrates than the corresponding audio data streams received by MCU 12. For instance, the sub-stream associated with terminal device 14A may have a lower bitrate than the audio data stream transmitted to MCU 12 by terminal device 14A. Likewise, the sub-stream associated with terminal device 14B may have a lower bitrate than the audio data stream transmitted by MCU 12 by terminal device 14B. In some examples, the sub-streams may have a very low bit rate, such as 1-2 kb/s. Furthermore, in some examples, the sub-streams may include coded audio samples having bit depths less than the bit depths of corresponding audio samples in the audio data streams transmitted by terminal devices 14.

Furthermore, to generate a mixed audio data stream for transmission to a particular terminal device, MCU 12 may, in accordance with the techniques of this disclosure, modify the mixed audio data stream by steganographically embedding into the mixed audio data stream the sub-streams associated with the other terminal devices. MCU 12 may transmit the resulting modified mixed audio data stream to the particular one of terminal devices 14. In some examples, a difference between an amount of audio distortion associated with the modified mixed audio data and an amount of audio distortion associated with the unmodified mixed audio data is less than a detection threshold. The detection threshold may be an amount of distortion noticeable by a typical human auditory system. Furthermore, in some examples, a bitrate of the modified mixed audio data is not greater than a bitrate of the mixed audio data prior to embedding the sub-streams. MCU 12 may be able to hide significant amounts of data in a standard coded speech stream. For instance, MCU 12 may be able to embed up to 2 kb/s into a 12.2 kb/s Enhanced Full Rate (EFR) bitstream with relatively little degradation.

MCU 12 may steganographically embed the sub-streams into the mixed audio data stream in various ways. For example, the mixed audio data stream may represent sound as a series of encoded audio samples. Each of the audio samples may consist of a fixed number of bits. A human listener may not be able to perceive changes in sound caused by changes to the least significant bits (LSBs) of the audio samples. Hence, MCU 12 may steganographically embed the sub-streams into the mixed audio data stream by changing one or more of the LSBs of audio samples in the mixed audio data stream such that the LSBs of the audio samples represent data of the sub-streams. That is, MCU 12 may modify least-significant bits of audio samples of the mixed mono audio data to indicate a first and a second sub-stream.

In another example, if a sample rate of the mixed audio data stream is sufficiently high, a human listener may not be able to perceive changes in sound caused by periodic replacement of audio samples in the mixed audio data stream with samples from the sub-streams. Hence, in this example, MCU 12 may steganographically embed the sub-streams into the mixed audio data stream by periodically replacing audio samples in the mixed audio data stream with audio samples or other data of the sub-streams.

In another example, MCU 12 may add steganographically embed the sub-streams into the mixed audio data stream by hiding bits on a fixed codebook (FCB) of an algebraic code excited linear projection (ACELP) coder (e.g., adaptive multi-rate narrowband ("AMR-NB")) by hiding a fixed number of bits per FCB track. The bits are hidden by restricting the number of allowed pulse combinations. In the case of AMR-NB, where there are two pulses per track, one approach includes constraining the pulse positions so that an exclusive OR (XOR) of the two pulse positions on a given track are equal to the watermark to transmit. One or two bits per track may be transmitted this way.

In another example, the watermark is adaptive. Instead of embedding a fixed number of bits per pulse track (e.g., one or two) as described in the previous example, MCU 12 determine which tracks are perceptually most important. In some examples, MCU 12 may accomplish this using information already present at both an encoder and decoder, such that information indicating which tracks are perceptually most important does not need to be additionally or separately transmitted. In one configuration, a long term prediction (LTP) contribution may be used to protect the most important tracks from the watermark. For instance, the LTP contribution normally exhibits clear peaks at the main pitch pulse, and may be available already at both encoder and decoder. In this example, AMR-NB may be used. Alternatively, in this example, eAMR may be used. eAMR may have the ability to transport a "thin" layer of wideband information hidden within a narrowband bitstream. U.S. patent application Ser. No. 13/275,997, the entire content of which is incorporated herein by reference, describes the use of eAMR in watermarking.

In this way, MCU 12 may receive a first audio data stream. The first audio data stream may represent sound captured by (i.e., associated with) a first terminal device (e.g., terminal device 14A) participating in a teleconference. In addition, MCU 12 may receive a second audio data stream. The second audio data stream may represent sound captured by (i.e., associated with) a second terminal device (e.g., terminal device 14B) participating in the teleconference. MCU 12 may generate, based at least in part on the first audio data stream and the second audio data stream, a mixed audio data stream. Furthermore, MCU 12 may generate a modified mixed audio data stream at least in part by steganographically embedding into the mixed audio data stream a first sub-stream and a second sub-stream such that the modified mixed audio data stream supports both mono audio playback and stereo audio playback. The first sub-stream includes a representation of the sound associated with the first terminal device. The second sub-stream includes a representation of the sound associated with the second terminal device. MCU 12 may output the modified mixed audio data stream to a third terminal device (e.g., terminal device 14C) participating in the teleconference.

Terminal device 14C may receive a mixed audio data stream from MCU 12. If the terminal device 14C is not configured for multi-stream audio playback, terminal device 14C may decode the mixed audio data stream and play back the mixed audio data stream using a monaural channel.

However, if terminal device 14C is configured for multichannel audio playback, terminal device 14C may perform an inverse steganographic process to extract the sub-streams from the mixed audio data stream. Terminal device 14C may decode the mixed audio data stream and the extracted sub-streams. Furthermore, terminal device 14C may determine, based on the sub-streams, sounds in the mixed audio data stream associated with (e.g., initially detected by) the terminal devices other than terminal device 14C. For example, terminal device 14C may determine, based on a first substream, portions of the mixed audio data stream associated with a first terminal device (e.g., terminal device 14A) and may determine, based on a second sub-stream, portions of the mixed audio data stream associated with a second terminal device (e.g., terminal device 14B). In some instances, portions of the mixed audio data stream associated with the first terminal device and with the second terminal device overlap, such as when the participants using terminal devices 14A and 14B, talk at a same time (or concurrent to one another).

Terminal device 14C may apply, based on the sounds associated with the other terminal devices, head-related transfer functions (HRTFs) to copies of the mixed audio data stream. A HRTF is a response that characterizes how an ear receives a sound from a point in space. Terminal device 14C may use a pair of HRTFs for two ears to synthesize a binaural sound that seems to come from a particular point in space. For instance, terminal device 14C may apply a HRTF to a copy of mixed audio data stream for the left audio channel to synthesize a binaural sound that seems to come from a point in space to the left of the user of terminal device 14C. Similarly, terminal device 14C may apply a HRTF to a copy of the audio data stream for the right audio channel to synthesize a binaural sound that seems to come from a point in space to the right of the user of terminal device 14C. Various HRTFs are known in the art.

Terminal device 14C may generate a multi-channel audio data stream based on the copies of the mixed audio data stream generated by applying the HRTFs. For example, terminal device 14C may generate a spatialized stereo audio data stream such that a left and a right channel of the spatialized stereo audio data stream are based on the copies of the mixed audio data stream generated by applying the HRTFs. In this way, terminal device 14C may generate the spatialized stereo audio data stream such that the sounds associated with a first terminal device (e.g. terminal device 14A) are perceived to come from a point in space to the left of a listener associated with terminal device 14C and the sounds associated with a second terminal device (e.g., terminal device 14B) are perceived to come from a point in space to the right of the listener. Terminal device 14C (or another device) may convert the spatialized mixed stereo audio data stream into analog signals. Speakers may convert the analog signals into audible sound.

In this way, terminal device 14C may receive a mixed audio data stream. Terminal device 14C may perform an inverse steganographic process to extract, from the mixed audio data stream, a first sub-stream. The first sub-stream may be associated with a first terminal device participating in a teleconference. In addition, terminal device 14C may perform an inverse steganographic process to extract, from the mixed audio data stream, a second sub-stream. The second sub-stream may be associated with a second terminal device participating in the teleconference. Furthermore, terminal device 14C may generate, based at least in part on the mixed audio data stream, the first sub-stream and the second sub-stream, a multi-channel audio data stream. The discussion above with regard to terminal device 14C may be applicable, with the appropriate changes, to any other one of terminal devices 14.

Furthermore, in this way, MCU 12 may generate audio data streams that are capable of multi-channel audio playback and are backward compatible with terminal devices that do not support multi-channel audio playback. In other words, the mixed audio data stream is compatible with terminal devices that are configured for monaural playback and are not configured for multi-channel (e.g., stereo) playback. Furthermore, the techniques of this disclosure may enable terminal devices 14 to determine sources (e.g., terminal devices) associated with sounds even when the mixed audio data stream concurrently includes sounds from multiple sources. For instance, the sounds associated with a first terminal device may include speech that is concurrent with speech associated with a second terminal device. Accordingly, by using steganography to embed the sub-streams, the techniques may enable both multi-channel playback of the mixed audio data stream and monaural playback of the mixed audio data stream.

While described in this disclosure with respect to audio-only teleconferences (which may refer to teleconferences not accompanied by video or other media), the techniques may be performed with respect to videoconferences (which may refer to teleconferences that are accompanied by video), online collaborative conferences (which may refer to teleconferences that are accompanied by online presentations or collaborative document editing and viewing) or any other type of conference that includes audio data from three or more participants. The techniques described in this disclosure should therefore not be limited in this respect to the examples set forth in this disclosure.

As indicated above, MCU 12 may receive monaural representations of sounds detected and captured by terminal devices 14. In other examples, MCU 12 may receive stereo representations of the sounds detected and captured by terminal devices 14. In such examples, MCU 12 may convert the stereo representations into monaural representations and process the resulting monaural representations as described above.

Figure 2:
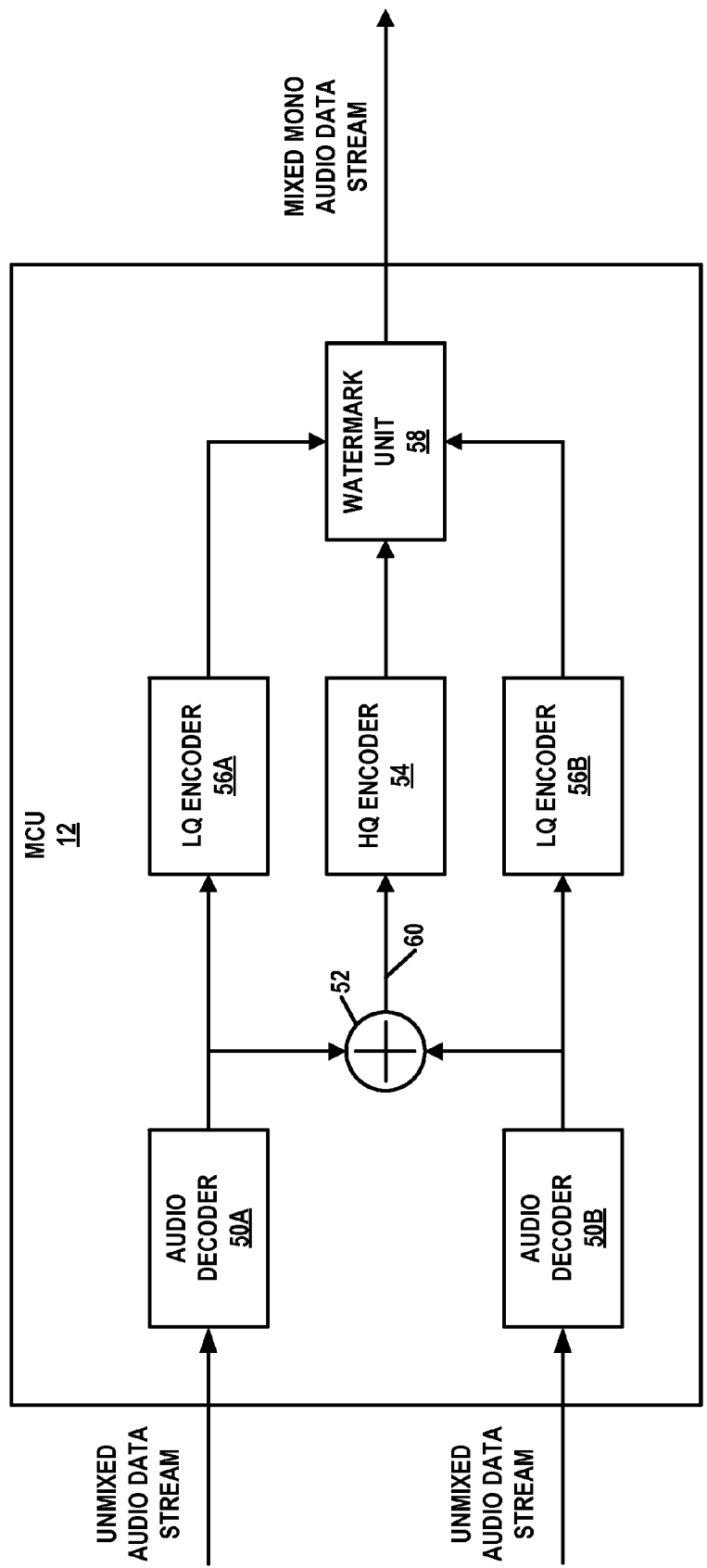
FIG. 2 is a block diagram illustrating an example multi-party control unit (MCU) that may perform various aspects of the techniques described in this disclosure.

FIG. 2 is a block diagram illustrating an example MCU 12 that performs various aspects of the techniques described in this disclosure. In the example of FIG. 2, MCU 12 comprises an audio decoder 50A, an audio decoder 50B, a summer 52, a high-quality (HQ) encoder 54, a low-quality (LQ) encoder 56A, a LQ encoder 56B, and a watermark unit 58.

Audio decoder 50A receives and decodes an audio data stream from a terminal device. For example, audio decoder 50A may receive and decode the audio data stream, indicated in FIG. 1 by arrow 16A, from terminal device 14A. Audio decoder 50B receives and decodes an audio data stream from a different terminal device. For example, audio decoder 50B may receive and decode the audio data stream, indicated in FIG. 1 by arrow 16B, from terminal device 14B. Audio decoders 50A and 50B may use various audio and/or speech coding processes to decode the audio data streams. For example, audio decoders 50A and/or 50B may decode the audio data streams using Code Excited Linear Prediction (CELP) coding, Codec2 coding, Adaptive Multi-Rate Wideband (AMR-WB) coding, Speex coding, or another form of voice or audio data compression.

Summer 52 may receive the audio data streams from audio decoders 50A and 50B. Summer 52 may generate a mixed audio data stream 60. Mixed audio data stream 60 may include a monaural representation of a mix of the sounds represented by the audio data streams. In some examples, summer 52 may generate mixed audio data stream 60 by adding audio samples of the audio data streams.

HQ encoder 54 may encode mixed audio data stream 60. HQ encoder 54 may encode mixed audio data stream 60 such that the sound represented by the mixed audio data stream retains (comparatively) high-fidelity (which may refer to quality). Furthermore, in some examples, HQ encoder 54 applies data compression to mixed audio data stream 60. For instance, HQ encoder 54 may encode mixed audio data stream 60 using CELP coding, Codec2 coding, Adaptive Multi-Rate Wideband (AMR-WB) coding, Speex coding, or another form of voice or audio data compression.

LQ encoder 56A may receive the audio data stream from audio decoder 50A. LQ encoder 56A may process to the audio data stream to generate a sub-stream. LQ encoder 56A may generate the sub-stream in various ways. For example, LQ encoder 56A may generate a sub-stream that is a (comparatively) low-quality version of the audio data stream. For instance, in this example, LQ encoder 56A may generate the sub-stream in part by quantizing the values of audio samples in the audio data stream to reduce the bit depths of the audio samples. In another example, LQ encoder 56A may reduce the sample rate of the audio data stream. In some examples, LQ encode 56A may reduce the sample rate by decimating the audio samples of the audio data stream. Furthermore, in some examples, LQ encoder 56A may apply data compression to the audio data stream, such as CELP coding, Codec2 coding, or another form of voice or audio data compression. In another example, the sub-stream may indicate only the gain of the audio data stream. In some examples, LQ encoder 56A may code the parameters of the sub-stream differentially from that of the high-quality mix generated by HQ encoder 54. LQ encoder 56B may receive the audio data stream from audio decoder 50B and may process the audio data stream in a similar fashion as LQ encoder 56A.

In the example of FIG. 2, watermark unit 58 receives the sub-streams from LQ encoders 56A and 56B. In addition, watermark unit 58 receives the high-quality mixed audio data stream from HQ encoder 54. Watermark unit 58 may modify the mixed audio data stream to embed the sub-streams into the mixed audio data stream steganographically. Watermark unit 58 may use any of the steganographic techniques described above, or others, to embed the sub-streams into the mixed audio data stream. Watermark unit 58 may output the modified mixed audio data stream. Watermarking is only one way of transmitting the individual descriptions of the sub-streams. In other examples, the sub-streams may be transmitted in an alternate media stream.

Although not shown in the example of FIG. 2, MCU 12 may receive audio data streams from one or more additional terminal devices. For example, MCU 12 may receive audio data streams from three or more terminal devices. In this example, MCU 12 may encode the mono audio data streams from the additional terminal devices to generate sub-streams associated with the additional terminal devices. In addition, MCU 12 may add the mono audio data streams from the additional terminals devices into the mixed audio data stream and encode the resulting mixed audio data stream. MCU 12 may then use steganographic techniques to embed, into the encoded mixed audio data stream, the sub-streams associated with the additional terminal devices.

FIG. 2 is merely an example and MCU 12 may be implemented in ways other than that shown in FIG. 2. For instance, MCU 12 may, in other examples, include more, fewer, or different components. In the example of FIG. 2, MCU 12 includes LQ encoder 56A and LQ encoder 56B. In other examples, terminal devices 14 may provide the functionality of LQ encoders 56A and 56B. In other words, terminal devices 14 may generate the sub-streams. In such examples, terminal devices 14 may send the sub-streams to MCU 12 in addition to sending the regular-quality audio data streams to MCU 12. In some examples, terminal devices 14 may steganographically embed the sub-streams into the regular-quality audio data streams.

Figure 3:
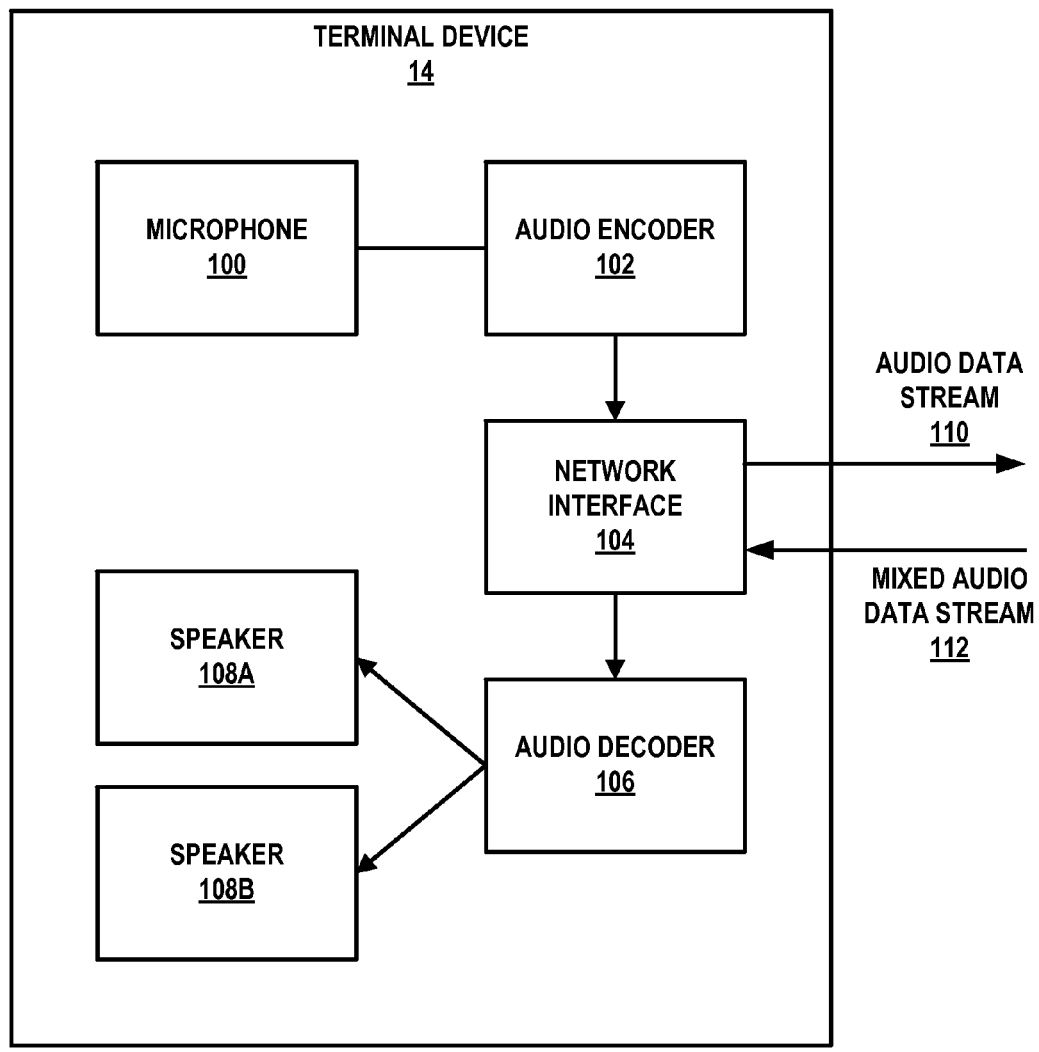
FIG. 3 is a block diagram illustrating an example terminal device in performing various aspects of the techniques described in this disclosure.

FIG. 3 is a block diagram illustrating an example of one of terminal devices 14 in performing various aspects of the techniques described in this disclosure. Terminal device 14 may represent any of terminal devices 14A, 14B, or 14C illustrated in the example of FIG. 1. FIG. 3 is merely an example and terminal device 14 may be implemented in ways other than that shown in FIG. 3. For instance, terminal device 14 may, in other examples, include more, fewer, or different components.

In the example of FIG. 3, terminal device 14 comprises a microphone 100, an audio encoder 102, a network interface 104, and an audio decoder 106. Terminal device 14 also includes a set of speakers 108A and 108B (collectively, "speakers 108"). Microphone 100 captures sound in the vicinity of terminal device 14. For example, microphone 100 may detect and capture the sound of a user's voice or speech. Microphone 100 generates an electrical signal based on the detected sound. Audio encoder 102 converts the electrical signal generated by microphone 100 into an audio data stream 110. Audio data stream 110 may be one of the audio data stream indicated by arrows 16 in FIG. 1. Audio data stream 110 may include a monaural representation of the detected sound. In some examples, audio encoder 102 may perform various types of data compression on audio data stream 110 to reduce the bitrate of the audio data stream. Network interface 104 may transmit audio data stream 110 to a MCU, such as MCU 12 (FIG. 1).

In addition to transmitting audio data stream 110 to MCU 12, network interface 104 may receive a mixed audio data stream 112 from MCU 12. Mixed audio data stream 112 may be one of the mixed audio data stream indicated by arrows 18 in FIG. 1. Network interface 104 may provide the mixed audio data stream to audio decoder 106. Audio decoder 106 may process the mixed audio data stream in accordance with the techniques described in this disclosure to generate signals that drive speakers 108 to reproduce sound.

Figure 4:
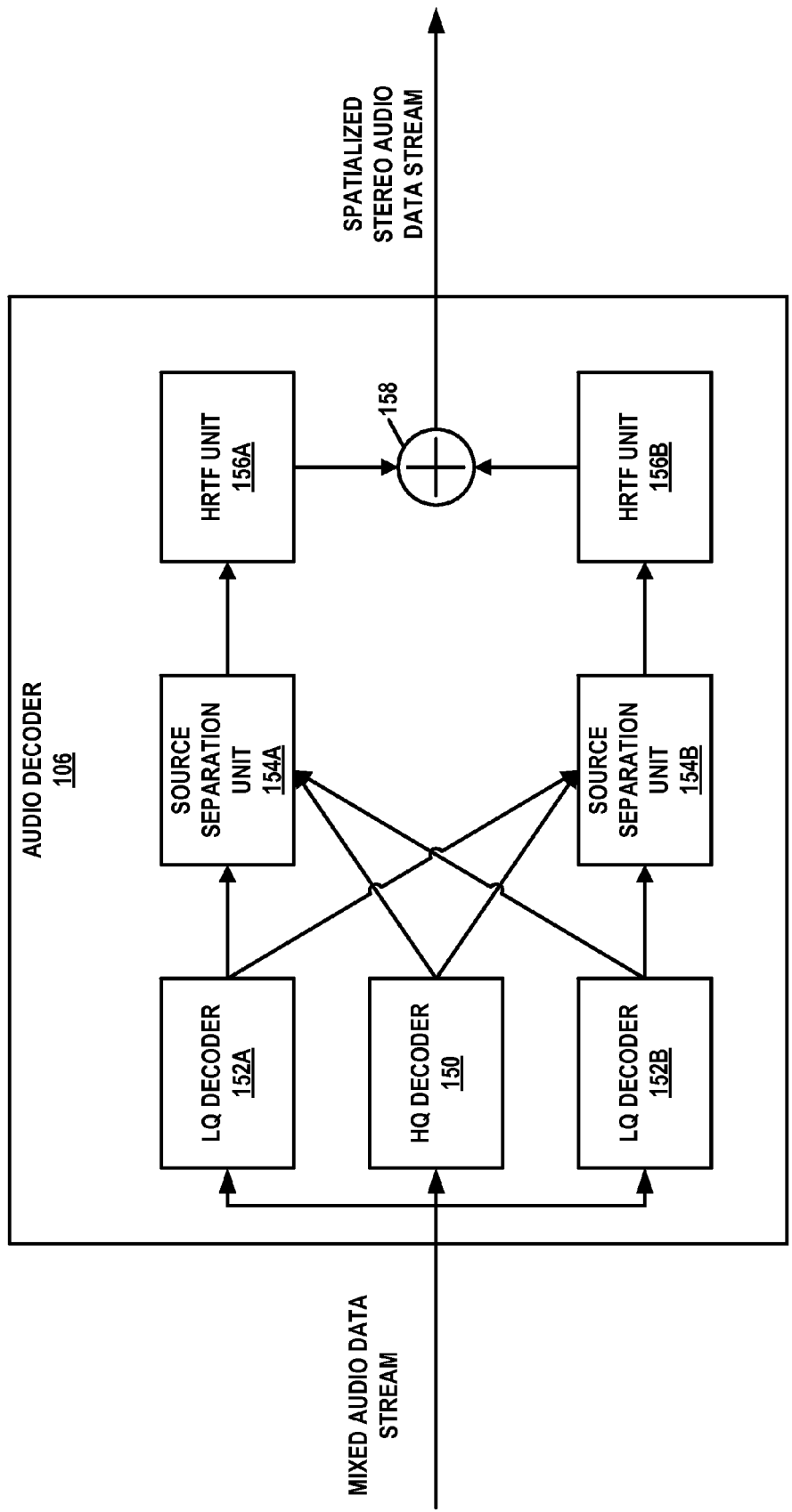
FIG. 4 is a block diagram illustrating an example audio decoder in performing various aspects of the techniques described in this disclosure.

FIG. 4 is a block diagram illustrating an example of audio decoder 106 in performing various aspects of the techniques described in this disclosure. FIG. 4 is merely an example and audio decoder 106 may be implemented in ways other than that shown in FIG. 4. For instance, audio decoder 106 may, in other examples, include more, fewer, or different components. In the example of FIG. 4, audio decoder 106 includes a HQ decoder 150, a LQ decoder 152A, a LQ decoder 152B, a source separation unit 154A, a source separation unit 154B, a HRTF unit 156A, a HRTF unit 156B, and a stereo output unit 158.

HQ decoder 150, LQ decoder 152A, and LQ decoder 152B receive a mixed audio data stream. HQ decoder 150 may decode the mixed audio data stream to reverse the data compression applied to the mixed audio data stream. By decoding the mixed audio data stream, HQ decoder 150 may generate a decoded mixed audio data stream that comprises a series of audio samples.

LQ decoder 152A may perform an inverse steganographic process to extract a sub-stream from the mixed audio data stream. For example, if the lower-quality sub-stream is steganographically embedded in the mixed audio data stream in the least-significant bits of audio samples, LQ decoder 152A may decode the mixed audio data stream. In this example, LQ decoder 152A may isolate the least-significant bits of the audio samples in order to extract the sub-stream. In some examples, the sub-stream extracted by LQ decoder 152A includes a monaural representation of sound detected at one of the terminal devices participating in a teleconference. In some examples, LQ decoder 152A decodes the sub-stream to reverse the data compression applied to the sub-stream. For example, LQ decoder 152A may convert the sub-stream into a series of audio samples. LQ decoder 152B may perform similar operations to extract a second sub-stream. In some examples, the sub-stream extracted by LQ decoder 152B includes a monaural representation of sound detected at another one of the terminal devices participating in the teleconference.

The mixed audio data stream includes a monaural representation of a mix of sounds associated with at least a first terminal device and a second terminal device. For instance, a waveform represented by the mixed audio data stream may be a sum of a waveform represented by sound detected by at least a first terminal device and a second terminal device. Source separation unit 154A may receive the decoded mixed audio data stream from HQ decoder 150, the sub-stream from LQ decoder 152A, and the sub-stream from LQ decoder 152B. Source separation unit 154A may analyze the decoded mixed audio data stream and the sub-streams to determine, within the mixed audio data stream, the sounds associated with the first terminal device.

For example, the sub-stream may indicate gain associated with sounds detected by the first terminal device. In this example, source separation unit 154B may determine, based at least in part on the gain associated with the sounds detected by the first terminal device, that certain portions of the sound represented by the mixed audio data stream are attributable to the sounds detected by the first terminal device. In another example, the sub-stream may indicate a waveform of the sounds detected by the first terminal device. In this example, source separation unit 154A may apply, to the waveform indicated by the mixed audio data stream, a band pass filter based on the waveform indicated by the sub-stream. The band pass filter may suppress frequencies in the mixed audio data stream's waveform that do not correspond to frequencies in the waveform of the sounds detected by the first terminal device. In another example, source separation unit 154A may receive the sub-stream from LQ decoder 152B in addition to receiving the decoded mixed audio data stream from HQ decoder 150 and the sub-stream from LQ decoder 152. In this example, source separation unit 154A may use the three audio data streams to determine the sounds associated with the first terminal device.

In another example, source separation unit 154A may determine, based on the sub-streams and not based on the mixed audio data stream from HQ decoder 150, the sounds associated with the first terminal device. In another example, source separation unit 154A may determine, on a frame-by-frame basis and based at least in part on the normalized energy ratio of the sub-stream from LQ decoder 152A versus the sub-stream from LQ decoder 152B, the sounds associated with the first terminal device. Thus, in this example, source separation unit 154A may calculate α value a for a current frame.

$$\alpha = NRG\_LQA/(NRG\_LQA + NRG\_LQB)$$

In the equation above, NRG_LQA is the energy, for the current frame, of the sub-stream from LQ decoder 152A and NRG_LQB is the energy, for the current frame, of the sub-stream from LQ decoder 152B. Source separation unit 154A may then determine the sounds, within the current frame, associated with the first terminal device at least in part by multiplying the audio samples of the current frame of the mixed audio data stream by α. The sounds within the current frame that are associated with the second terminal device may be determined by multiplying the audio samples of the current frame of the mixed audio data stream by (1−α). Better performance may be achieved by running a source separation algorithm using all three signals, rather than two of the signals. In some examples, due to the low bit rates of the sub-streams, the sub-streams may not contain enough data to decode the sub-streams individually, but may contain only enough side information to assist the source separation. In another example, source separation unit 154A may use a combination, such as a linear combination, of the two previous examples of this paragraph. In another example, source separation unit 154A may determine the sounds associated with the first terminal device using the example techniques of this paragraph on a frequency band basis (i.e., with one α factor per frequency band). In other examples, source separation unit 154A may use pitch information to perform comb filtering in order to determine the sounds associated with the first terminal device.

Source separation unit 154B may perform a similar process to determine, based at least in part on the decoded mixed audio data stream from HQ decoder 150, the sub-stream from LQ decoder 152A, and the sub-stream from LQ decoder 152B, that certain portions of the sound represented by the mixed audio data stream are attributable to the second terminal device. Source separation unit 154B may determine the sounds attributable to the second terminal device in a manner similar to source separation unit 154A.

HRTF unit 156A may apply, based on the sounds associated with the first terminal device, one or more HRTFs to a first copy of the mixed audio data stream. For example, HRTF unit 156A may increase, within the first copy of the mixed audio data stream, the volume of the sounds associated with the first terminal device relative to sounds associated with other terminal devices participating in the teleconference. Furthermore, HRTF unit 156A may temporally delay, within the first copy of the mixed audio data stream, sounds associated with the other terminal devices participating in the teleconference. Such volume changes and temporal delays may mimic the differences in volume and receiving times of sounds as perceived by a user's left and right ears. In some examples, HRTF unit 156A may receive, from source separation unit 154B (or other source separation units of audio decoder 106), data indicating the sounds associated with the second terminal device (or other terminal devices). In such examples, HRTF unit 156A may use this data to apply further HRTFs to the first copy of the mixed audio data stream. HRTF unit 156B may apply, based on sounds associated with the second terminal device, one or more HRTFs to a second copy of the mixed audio data stream. HRTF unit 156B may apply similar HRTFs to those described above.

Stereo output unit 158 may receive the first copy of the mixed audio data stream from HRTF unit 156A and may receive the second copy of the mixed audio data stream from HRTF unit 156B. Stereo output unit 158 may generate a stereo audio data stream that includes the first copy of the mixed audio data stream as part of a left channel of the multi-channel audio data stream and may include the second copy of the mixed audio data stream as part of a right channel of the multi-channel audio data stream. Speaker 108A (FIG. 3) may output sound represented by the data on the left channel. Speaker 108B (FIG. 3) may output sound represented by the data on the right channel.

Although not shown in the example of FIG. 4, audio decoder 106 may extract and process more than two sub-streams. For example, audio decoder 106 may, in some examples, include an additional LQ decoder that extracts a third sub-stream that includes a representation of sounds associated with a third terminal device participating in the teleconference. In this example, an additional source separation unit may determine, based on the third sub-stream, sounds within the mixed audio data stream attributable to the third terminal device. An additional HRTF unit may apply, based on the sounds associated with the third terminal device, one or more HRTFs to a third copy of the mixed audio data stream. In this example, stereo output unit 158 may generate the multi-channel audio data stream such that the left (or right) channel of the multi-channel audio data stream is based on a sum of the third copy of the mixed audio data stream and the first (or second) copy of the mixed audio data stream.

Figure 5:
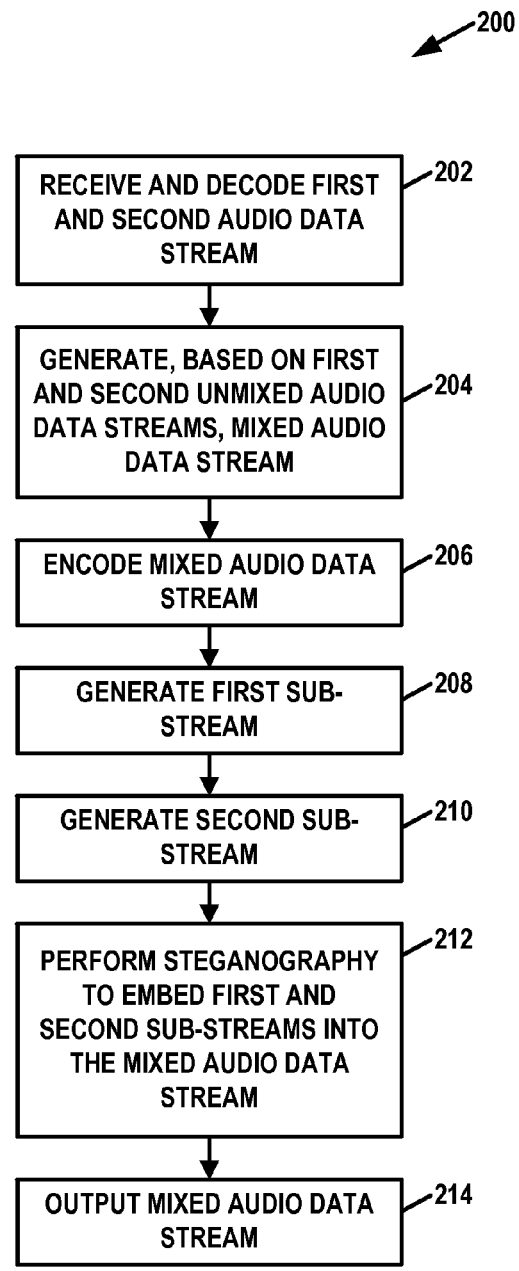
FIG. 5 is a flowchart illustrating an example operation of a MCU in performing various aspects of the techniques described in this disclosure.

FIG. 5 is a flowchart illustrating an example operation 200 of MCU 12 in performing various aspects of the techniques described in this disclosure. In the example of FIG. 5, audio decoders 50A and 50B receive and decode a first and a second audio data stream (202). Summer 52 may generate, based on the first and second audio data streams, a mixed audio data stream (204). HQ encoder 54 may encode the mixed audio data stream (206). In addition, LQ encoder 56A generates a first sub-stream (208). The first sub-stream may include a lower-quality monaural representation of the sound represented in the first audio data stream. In some examples, LQ encoder 56B may use a voice encoder (vocoder) to perform data compression on the first sub-stream. LQ encoder 56B generates a second sub-stream (210). The second sub-stream may include a lower-quality monaural representation of the sound represented in the second audio data stream. In some examples, LQ encoder 56B may use a vocoder to perform data compression on the second sub-stream.

Watermark unit 58 may perform steganography to embed the first and second sub-streams into the mixed audio data stream (212). For instance, watermark unit 58 may steganographically embed the first and second encoded sub-streams into the encoded mixed audio data stream. MCU 12 may output the resulting version of the mixed audio data stream (214).

Figure 6:
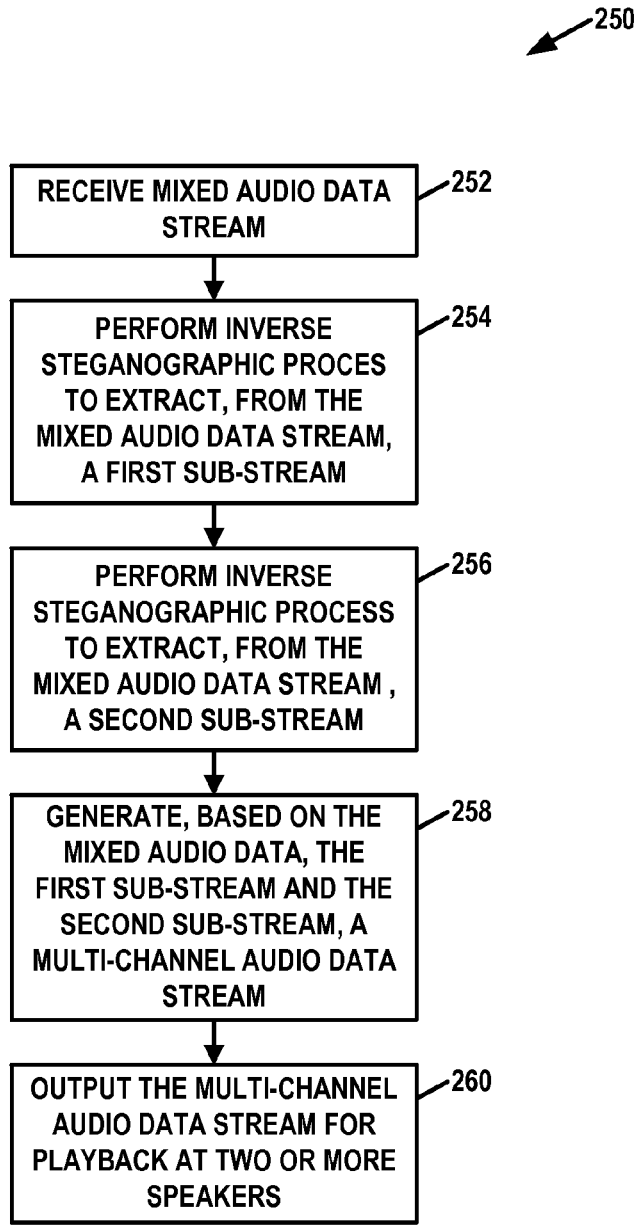
FIG. 6 is a flowchart illustrating an example operation of an audio decoder in performing various aspects of the techniques described in this disclosure.

FIG. 6 is a flowchart illustrating an example operation 250 of audio decoder 106 in performing various aspects of the techniques described in this disclosure. The flowcharts of FIGS. 5 and 6 are examples. In other examples, MCU 12 and audio decoder 106 may perform operations that include more, fewer, or different actions than those shown in the examples of FIGS. 5 and 6.

In the example of FIG. 6, audio decoder 106 receives a mixed audio data stream (252). In addition, audio decoder 106 performs an inverse steganographic process to extract, from the mixed audio data stream, a first sub-stream (254). The first sub-stream is associated with a first terminal device participating in a teleconference. For instance, the first sub-stream may include a monaural representation of sounds detected by the first terminal device. Audio decoder 106 may also perform an inverse steganographic process to extract, from the mixed audio data stream, a second sub-stream (256). The second sub-stream is associated with a second terminal device participating in the teleconference. For instance, the second sub-stream may include a monaural representation of sounds detected by the second terminal device.

In the example of FIG. 6, audio decoder 106 generates, based at least in part on the mixed audio data stream, the first sub-stream and the second sub-stream, a multi-channel audio data stream (258). Audio decoder 106 may output the multi-channel audio data stream for playback at two or more speakers (260).

In the example of FIG. 6, audio decoder 106 extracts two sub-streams from the mixed audio data stream. It should be appreciated that in other examples, audio decoder 106 extracts more than two sub-streams from the mixed audio data stream and generates the multi-channel audio data stream based on the mixed audio data stream and each of the extracted sub-streams.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
generating, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference;
generating a first sub-stream that is a lower-quality monaural representation of the first audio data stream, wherein generating the first sub-stream comprises using a vocoder to perform data compression on the first sub-stream;
generating a second sub-stream that is a lower-quality monaural representation of the second audio data stream, wherein generating the second sub-stream comprises using the vocoder to perform data compression on the second sub-stream;
generating a modified mixed audio data stream at least in part by steganographically embedding into the mixed audio data stream the first sub-stream and the second sub-stream such that the modified mixed audio data stream supports both mono audio playback and stereo audio playback; and
outputting the modified mono audio data stream to a third terminal device participating in the teleconference.

2. The method of claim 1,
wherein a difference between an amount of audio distortion associated with the modified mixed audio data stream and an amount of audio distortion associated with the mixed audio data stream prior to embedding the first and second sub-streams is less than a distortion threshold; and
wherein a bitrate of the modified mixed audio data stream is not greater than a bitrate of the mixed mono audio data prior to embedding the first and second sub-streams.

3. The method of claim 1, wherein generating the modified mixed audio data stream comprises:
applying a form of data compression to the mixed audio data stream; and
steganographically embedding the first and second sub-streams into the mixed audio data stream.

4. The method of claim 1, wherein the first sub-stream has a lower bitrate than the first audio data stream and the second sub-stream has a lower bitrate than the second audio data stream.

5. The method of claim 1, wherein generating the modified mixed audio data stream comprises modifying least-significant bits of audio samples of the mixed mono audio data to indicate the first and second sub-streams.

6. A method comprising:
performing an inverse steganographic process to extract, from a mixed audio data stream, a first sub-stream, wherein the first sub-stream is a lower-quality monaural representation of a first audio data stream representing sounds associated with a first terminal device participating in a teleconference, wherein the first sub-stream is generated using a vocoder to perform data compression on the first sub-stream;
performing an inverse steganographic process to extract, from the mixed audio data stream, a second sub-stream, wherein the second sub-stream is a lower-quality monaural representation of a second audio data stream representing sounds associated with a second terminal device participating in the teleconference, wherein the second sub-stream is generated using the vocoder to perform data compression on the second sub-stream; and
generating, based at least in part on the mixed audio data stream, the first sub-stream and the second sub-stream, a multi-channel audio data stream.

7. The method of claim 6, wherein:
the mixed audio data stream includes a monaural representation of a mix of sounds associated with the first terminal device and the sounds associated with the second terminal device, and
generating the multi-channel audio data stream comprises generating a spatialized stereo audio data stream such that the sounds associated with the first terminal device are perceived to come from a point in space to the left of a listener and the sounds associated with the second terminal device are perceived to come from a point in space to the right of the listener.

8. The method of claim 7, wherein generating the spatialized stereo audio data stream comprises:
determining, based at least in part on the first sub-stream, the sounds associated with the first terminal device;
determining, based at least in part on the second sub-stream, the sounds associated with the second terminal device;
applying, based at least in part on the sounds associated with the first terminal device, a head-related transfer function (HRTF) to a first copy of the mixed audio data stream, wherein a left channel of the spatialized stereo audio data stream is based at least in part on the first copy of the mixed audio data stream; and
applying, based at least in part on the sounds associated with the second terminal device, the HRTF to a second copy of the mixed audio data stream, wherein a right channel of the spatialized stereo audio data stream is based at least in part on the second copy of the mixed audio data stream.

9. The method of claim 7, wherein the sounds associated with the first terminal device include speech that is concurrent with speech associated with the second terminal device.

10. The method of claim 6, wherein least-significant bits of audio samples of the mixed mono audio data indicate the first and second sub-streams.

11. The method of claim 6, wherein bitrates of the first and second sub-streams are less than a bitrate of the mixed audio data stream.

12. The method of claim 6, wherein the mixed audio data stream is compatible with terminal devices that are configured for monaural playback and not configured for stereo playback.

13. A device comprising:
one or more processors configured to:
generate, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference;
generate a first sub-stream that is a lower-quality monaural representation of the first audio data stream, wherein generating the first sub-stream comprises using a vocoder to perform data compression on the first sub-stream;
generate a second sub-stream that is a lower-quality monaural representation of the second audio data stream, wherein generating the second sub-stream comprises using the vocoder to perform data compression on the second sub-stream;
generate a modified mixed audio data stream at least in part by steganographically embedding into the mixed audio data stream the first sub-stream and the second sub-stream such that the modified mixed audio data stream supports both mono audio playback and stereo audio playback; and
output the modified mono audio data stream to a third terminal device participating in the teleconference.

14. The device of claim 13,
wherein a difference between an amount of audio distortion associated with the modified mixed audio data stream and an amount of audio distortion associated with the mixed audio data stream prior to embedding the first and second sub-streams is less than a distortion threshold; and
wherein a bitrate of the modified mixed audio data stream is not greater than a bitrate of the mixed mono audio data prior to embedding the first and second sub-streams.

15. The device of claim 13, wherein the one or more processors are configured to:
apply a form of data compression to the mixed audio data stream; and
steganographically embed the first and second sub-streams into the mixed audio data stream.

16. The device of claim 13, wherein the first sub-stream has a lower bitrate than the first audio data stream and the second sub-stream has a lower bitrate than the second audio data stream.

17. The device of claim 13, wherein the one or more processors are configured to generate the modified mixed audio data stream at least in part by modifying least-significant bits of audio samples of the mixed mono audio data to indicate the first and second sub-streams.

18. The device of claim 13, wherein the device is a multiparty control unit (MCU).

19. A terminal device comprising:
one or more processors configured to:
perform an inverse steganographic process to extract, from a mixed audio data stream, a first sub-stream, wherein the first sub-stream is a lower-quality monaural representation of a first audio data stream representing sounds associated with a first terminal device participating in a teleconference, wherein the first sub-stream is generated using a vocoder to perform data compression on the first sub-stream;
perform an inverse steganographic process to extract, from the mixed audio data stream, a second sub-stream, wherein the second sub-stream is a lower-quality monaural representation of a second audio data stream representing sounds associated with a second terminal device participating in the teleconference, wherein the second sub-stream is generated using the vocoder to perform data compression on the second sub-stream; and generate, based at least in part on the mixed audio data stream, the first sub-stream and the second sub-stream, a multi-channel audio data stream.

20. The terminal device of claim 19, wherein:
the mixed audio data stream includes a monaural representation of a mix of sounds associated with the first terminal device and the sounds associated with the second terminal device, and
the one or more processors are configured to generate the multi-channel audio data stream at least in part by generating a spatialized stereo audio data stream such that the sounds associated with the first terminal device are perceived to come from a point in space to the left of a listener and the sounds associated with the second terminal device are perceived to come from a point in space to the right of the listener.

21. The terminal device of claim 20, wherein the one or more processors are configured to:
determine, based at least in part on the first sub-stream, the sounds associated with the first terminal device;
determine, based at least in part on the second sub-stream, the sounds associated with the second terminal device;
apply, based at least in part on the sounds associated with the first terminal device, a head-related transfer function (HRTF) to a first copy of the mixed audio data stream, wherein a left channel of the spatialized stereo audio data stream is based at least in part on the first copy of the mixed audio data stream; and
apply, based at least in part on the sounds associated with the second terminal device, the HRTF to a second copy of the mixed audio data stream, wherein a right channel of the spatialized stereo audio data stream is based at least in part on the second copy of the mixed audio data stream.

22. The terminal device of claim 20, wherein the sounds associated with the first terminal device include speech that is concurrent with speech associated with the second terminal device.

23. The terminal device of claim 19, wherein least-significant bits of audio samples of the mixed mono audio data indicate the first and second sub-streams.

24. The terminal device of claim 19, wherein bitrates of the first and second sub-streams are less than a bitrate of the mixed audio data stream.

25. The terminal device of claim 19, wherein the mixed audio data stream is compatible with terminal devices that are configured for monaural playback and not configured for stereo playback.

26. A device comprising:
means for generating, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference;
means for generating a first sub-stream that is a lower-quality monaural representation of the first audio data stream, wherein generating the first sub-stream comprises using a vocoder to perform data compression on the first sub-stream;
means for generating a second sub-stream that is a lower-quality monaural representation of the second audio data stream, wherein generating the second sub-stream comprises using the vocoder to perform data compression on the second sub-stream;

means for generating a modified mixed audio data stream at least in part by steganographically embedding into the mixed audio data stream the first sub-stream and the second sub-stream such that the modified mixed audio data stream supports both mono audio playback and stereo audio playback; and means for outputting the modified mono audio data stream to a third terminal device participating in the teleconference.

27. A terminal device comprising:
means for performing an inverse steganographic process to extract, from a mixed audio data stream, a first sub-stream, wherein the first sub-stream is a lower-quality monaural representation of a first audio data stream representing sounds associated with a first terminal device participating in a teleconference, wherein the first sub-stream is generated using a vocoder to perform data compression on the first sub-stream;
means for performing an inverse steganographic process to extract, from the mixed audio data stream, a second sub-stream, wherein the second sub-stream is a lower-quality monaural representation of a second audio data stream representing sounds associated with a second terminal device participating in the teleconference, wherein the second sub-stream is generated using the vocoder to perform data compression on the second sub-stream; and
means for generating, based at least in part on the mixed audio data stream, the first sub-stream and the second sub-stream, a multi-channel audio data stream.

28. A non-transitory computer-readable storage medium that stores instructions that, when executed by one or more processors of a device, configure the device to:
generate, based at least in part on a first audio data stream and a second audio data stream, a mixed audio data stream, the first audio data stream representing sound associated with a first terminal device participating in a teleconference, the second audio data stream representing sound associated with a second terminal device participating in the teleconference;
generate a first sub-stream that is a lower-quality monaural representation of the first audio data stream, wherein generating the first sub-stream comprises using a vocoder to perform data compression on the first sub-stream;
generate a second sub-stream that is a lower-quality monaural representation of the second audio data stream, wherein generating the second sub-stream comprises using the vocoder to perform data compression on the second sub-stream;
generate a modified mixed audio data stream at least in part by steganographically embedding into the mixed audio data stream the first sub-stream and the second sub-stream such that the modified mixed audio data stream supports both mono audio playback and stereo audio playback; and
output the modified mono audio data stream to a third terminal device participating in the teleconference.

29. A non-transitory computer-readable storage medium that stores instructions that, when executed by one or more processors of a device, configure the device to:
perform an inverse steganographic process to extract, from a mixed audio data stream, a first sub-stream, wherein the first sub-stream is a lower-quality monaural representation of a first audio data stream representing sounds associated with a first terminal device participating in a teleconference, wherein the first sub-stream is generated using a vocoder to perform data compression on the first sub-stream;

perform an inverse steganographic process to extract, from the mixed audio data stream, a second sub-stream, wherein the second sub-stream is a lower-quality monaural representation of a second audio data stream representing sounds associated with a second terminal device participating in the teleconference, wherein the second sub-stream is generated using the vocoder to perform data compression on the second sub-stream; and generate, based at least in part on the mixed audio data stream, the first sub-stream and the second sub-stream, a multi-channel audio data stream.

* * * * *